United States Patent [19]

Gathmann

[11] Patent Number: 4,711,647
[45] Date of Patent: Dec. 8, 1987

[54] PROCESS AND APPARATUS FOR DEGASSING LIQUIDS, ESPECIALLY POLYMER MELTS AND SOLUTIONS

[75] Inventor: Egon Gathmann, Remscheid, Fed. Rep. of Germany

[73] Assignee: Barmag Aktiengesellschaft, Remscheid-Lennep, Fed. Rep. of Germany

[21] Appl. No.: 855,094

[22] Filed: Apr. 22, 1986

[30] Foreign Application Priority Data

May 2, 1985 [DE] Fed. Rep. of Germany ....... 3515785
Aug. 20, 1985 [DE] Fed. Rep. of Germany ....... 3529708

[51] Int. Cl.⁴ ............................................. B01D 19/00
[52] U.S. Cl. .......................................... 55/52; 55/55; 55/164; 55/190; 55/201; 264/87; 425/203
[58] Field of Search ...................... 55/52, 55, 189, 190, 55/194, 201, 208; 264/87; 425/203

[56] References Cited

U.S. PATENT DOCUMENTS

| | | | |
|---|---|---|---|
| 1,614,526 | 1/1927 | Lambie et al. ...................... | 55/55 X |
| 2,146,532 | 2/1939 | Crane et al. ........................ | 55/190 X |
| 2,539,044 | 1/1951 | Walsh ................................. | 55/189 |
| 2,660,259 | 11/1953 | Morehouse ......................... | 55/189 |
| 2,741,326 | 4/1956 | Brown et al. ....................... | 55/189 |
| 2,797,767 | 7/1957 | Brooke et al. ...................... | 55/52 |
| 2,906,367 | 9/1959 | Vandenburgh ..................... | 55/55 X |
| 3,031,030 | 4/1962 | Rodenacker ........................ | 55/190 |
| 3,059,396 | 10/1962 | Thees ................................. | 55/189 |
| 3,223,026 | 12/1965 | Flemming et al. .................. | 55/1 X |
| 3,230,691 | 1/1966 | Kurashige .......................... | 55/201 X |
| 3,358,422 | 12/1967 | van der Schee .................... | 55/52 |
| 3,486,864 | 12/1969 | van der Schee et al. ........... | 55/52 X |
| 3,498,762 | 3/1970 | van der Schee et al. ........... | 55/52 X |
| 3,558,282 | 1/1971 | Evans ................................. | 55/52 X |
| 3,686,826 | 8/1972 | Saunders et al. ................... | 55/52 |
| 4,181,510 | 1/1980 | Sano et al. ......................... | 55/189 X |
| 4,616,989 | 10/1986 | Mewes et al. ...................... | 425/DIG. 39 |
| 4,617,089 | 10/1986 | Ullrich et al. ...................... | 425/376 R X |

FOREIGN PATENT DOCUMENTS

| | | | |
|---|---|---|---|
| 1142842 | 1/1963 | Fed. Rep. of Germany ............ | 55/1 |
| 2129839 | 12/1972 | Fed. Rep. of Germany ...... | 425/203 |
| 3248659 | 7/1984 | Fed. Rep. of Germany ...... | 425/203 |
| 28762 | 8/1971 | Japan ................................. | 55/52 |
| 3157 | 1/1979 | Japan ................................. | 425/203 |
| 1139639 | 1/1969 | United Kingdom ................ | 55/189 |
| 1375237 | 11/1974 | United Kingdom . | |
| 2079623 | 1/1982 | United Kingdom ................ | 55/52 |

Primary Examiner—Robert Spitzer
Attorney, Agent, or Firm—John H. Shurtleff

[57] ABSTRACT

A process and apparatus for degassing high-boiling liquids, especially polymer melts and solutions, to remove low-boiling liquids and gases as impurities by feeding the polymer melt or similar high-boiling liquid under expansion into the feed chamber of a gear wheel pump to flow downwardly and only partially fill this feed chamber, preferably so as to form a thin layer or pool of the melt atop the upper crown surfaces of the gear wheels. The impurities are withdrawn separately through a suction outlet and the liquid level of the melt is preset and maintained by suitable regulating apparatus adapted to control the speed of the gear wheels and/or the speed at which melt is delivered into the pump feed chamber.

15 Claims, 2 Drawing Figures

PROCESS AND APPARATUS FOR DEGASSING LIQUIDS, ESPECIALLY POLYMER MELTS AND SOLUTIONS

BACKGROUND OF THE INVENTION

This invention relates to a process for the degassing of liquids, especially polymer melts and solutions, e.g. for the continuous processing of thermoplastic polymers, and the invention also relates to an apparatus for carrying out the process.

Some thermoplastic polymers exhibit certain proportions of monomers, oligomeric solvents and other low-boiling liquid components as undesirable residues of their method of production. Other thermoplastics, such as polyamides, polymethylmethacrylates, polycarbonates and so-called "filled" polyolefines, etc., are very hygroscopic so that they have a strong tendency to take up moisture. The acquired moisture can be sealed into the interior of the product or adsorbed as a surface skin or it can be layered in the intermediate regions of the treated product. Moreover, in the extrusion of pulverulent molding batches, a high proportion of air is enclosed. Monomers (e.g. styrene) and solvents (e.g. ethylbenzene) often give the finished product an unpleasant odor. Besides, there are health considerations since many of these residual materials are toxic. Moisture causes the extruded semifinished product to exhibit a poor appearance and to possess mechanical properties which do not meet standard requirements. These unsatisfactory results occur because moisture and/or low boiling liquids, on account of the high processing temperatures of the raw material, are transformed into the gaseous state and lead to bubbles and striations which are outwardly visible in the finished product. A further reason is that some plastics tend to chemically decompose in the presence of moisture and/or the use of high temperatures, based upon suitable residence times.

In order to manufacture products with optimum qualities and properties, it is essential to remove the harmful liquid or gas components by degassing before or during the extrusion process. The degassing of the molding batch can be achieved by heating the material and by lowering the partial pressure in the space over the material or by simply evacuating this space.

For the degassing of polymer melts, it has been taught to install multiple screw extruders. See, for example, the so-called two stage cascade extruder disclosed in British patent specification No. 1,375,237 (1974), using a vacuum chamber between two screw extruders but avoiding a polymer melt in the first stage extruder. One problem with these measures resides in the fact that the capacity of the first screw cross section and the degassing region must be so coordinated with each other, that on the one hand an optimum throughput is achieved but, on the other hand, if too much melt is delivered from the first screw cross section, the degassing zone can become filled with melt and melt can be suctioned away.

Devices are known which avoid these particular disadvantages, but they require substantially higher priced equipment, e.g. shiftable or adjustable screw conveyors. A further disadvantage in the use of various screw extruders is the formation of deposits in the partially filled degassing zone of the screw and longer residence times of the melt in the extruder, leading to interruptions in production and a severe reduction in the quality of the product. Frequently also, problems arise if a higher melt pressure is permitted to build up with degassing extruders in order to overcome the pressure loss in the following apparatus, e.g. melt conduits, filters and nozzles. For the solution of this problem, in part, one can install very long extruders or one can connect melt pumps to the extruder. Both solutions are associated with high costs and lead to an additional thermal loading or stress of the product.

SUMMARY OF THE INVENTION

It is an object of the present invention to provide a process and an apparatus for the degassing of liquids, e.g. polymer melts or solutions, wherein the degassing can be accomplished more effectively than before and the retention time of the polymer melt can be substantially shortened, whereby thermal degradation of the polymer material and formation of deposits can be minimized.

This object has been achieved according to the invention, first by a process in which the liquid is conveyed or fed as a pressure-independent stream, which contains pressure releasable impurities of substantially lower boiling point, under expansion to a lower pressure, preferably at less than 1 bar, into the feed chamber of a gear wheel pump. The impurities which are released as a gas by the expansion are then separated and withdrawn from the feed chamber through any suitable outlet connection, preferably by means of a vacuum pump. The term "pressure-independent" is employed here to define a high-boiling liquid, such as a polymer melt or solution, which exhibits a negligible partial pressure in a vacuum in comparison to the low boiling and volatile liquids or the gases contained as impurities in the high-boiling liquid.

The high-boiling liquid introduced into the gear pump feed chamber is allowed to flow under the influence of gravity to form a pool or bath of liquid on the gear wheels of the pump as this liquid is transported by the pump into an exit or discharge zone of higher pressure, e.g. for extrusion into a final shaped product such as films, foils, filaments or the like.

The filling position or liquid level in the feed chamber is controlled to maintain a partial filling. The polymer melt may be conveyed by a conventional screw extruder through a throttle, preferably directly into the feed chamber of a gear wheel pump standing under reduced pressure. The throttle can be any nozzle device but preferably one in the form of a typical slot die, an annular die or a multihole nozzle (spinneret), the slot of which extends over the entire width of the paired gear wheels, so that the melt flows as a widened melt spray or melt curtain having a large surface area into the liquid pool forming on the gear wheels.

The melt can stream directly into the liquid pool but preferably flows vertically downwardly in a space above the pool. It is thus advantageous if the nozzle is located at an interval vertically above the opening nip of the gear wheels, since a good distribution of the melt over the gear wheels is then achieved, something which leads to very large surface areas and better degassing of the polymer melt or a similar liquid.

In a preferred embodiment of the apparatus according to the invention, a pressure relief line or connection is provided at an interval above the throttle in order to prevent a suctioning or entrainment of the melt into the relief line. The release of pressure can occur such that any high pressure built up in the feed pump chamber is exhausted to ambient (atmospheric) pressure. It is advantageous, however, to provide a reduced pressure in the feed pump chamber, since a more rapid and better degassing of the polymer melt can then be achieved. In order to attain a constant and relatively shallow filling level over the gear wheels, one can control the rotational speed of the pump or else one can vary the amounts of liquid conveyed by the extruder or even control the throttle. It is also feasible to simultaneously control any two or all three of these variables at the same time.

In a preferred embodiment of the apparatus according to the invention, sensors pick up and measure the pressure or the temperature of the polymer melt at the point of highest and lowest permissible melt level in the partly filled feed pump chamber. A signal from these sensors can be fed to a regulating unit in such a manner that a thin, film-like coating of melt is produced atop the rotating gear wheels. In general, the melt or liquid level is preferably controlled at or below the common tangential plane of the crown line of the gear wheels. In this way, a very large surface is produced for degassing the melt.

In the degassing of the polymer melts or solutions, the diffusion of the lower molecular weight components into the higher molecular weight liquid phase is generally the speed determining step. The slower this diffusion, the longer it is apt to take to substantially completely degas the liquid. The ideal performance is that in which the equilibrium concentration, corresponding to the partial pressure of the fluid material, is very quickly adjusted in the boundary layer of the liquid film which faces toward the gas space. In the interior of the melt film, a concentration gradient is formed and the diffusion of the lower molecular weight liquid components along the concentration gradient determines the speed of the degassing procedure. Practical degassing results further depend on the particular formation of the polymer melt surface, the total size of the surface and the thickness of the melt film. Therefore, it is very helpful to take those steps which will ensure only a very thin film-like coating of the melt atop the gear wheels, in order to achieve an optimum degassing.

The attainable equilibrium concentration in the liquid phase is lastly dependent upon the partial pressure of the low-boiling liquid impurities present in the pump feed chamber. Good results can be achieved by using pressures of less than 1 bar in the pump feed chamber. The conditions for mass transfer in a polymer melt film are conclusive as to the extent to which the average concentration in the liquid phase can approach the equilibrium value.

It has proven to be advantageous for the degassing if the peripheral wall of the pump over part of the gear circumference directly adjacent each gear wheel forms pocket-like enlargements, referred to here as catchment pockets or entry pockets of the feed chamber. Hereby, a rotating kneading or mastication of the melt occurs, whereby new surfaces are constantly produced for the degassing. Most of the degassing can take place while the liquid flows down from the feed or injection nozzle in thin films or small diameter strands, but the additional turning or mixing action induced by the entry pockets is highly beneficial.

The degassed polymer melt is picked up by the rotating gear pump and transported from the region of lower pressure (vacuum) on the feed side of the pump to a region of higher pressure on the exit side. The gear tooth spaces filled with melt are completely emptied on the exit side, so that no stagnant zones or deposits are present to cause thermal damage. On account of its structural specifications, it is easier by means of the gear wheel feed pump to produce higher pressures on the exit side than with a typical degassing screw extruder. Pressure losses in the following melt conduits, filters or nozzles can thus be much more easily compensated.

From the gear wheel pump, the degassed polymer melts are delivered to the extrusion or spinning nozzles to fabricate final products. From the quality of these products, it can be seen that the melt is very favorably degassed by the apparatus of the invention through creation of a large surface. A further advantage of the degassing apparatus is the shorter structural length required for the extrusion unit coupled on its outlet side to the degasser of the invention.

In order to avoid changing the viscosity of the polymer melt conveyed from the extruder during the degassing procedure, and to thereby uniformly maintain the flow of the transported mass at all points of the pump housing, it is further recommended that the pump housing be heatable, preferably by use of a liquid or vaporous heating agent conducted through double walls of the housing.

THE DRAWINGS

The invention is explained in greater detail with the aid of the following drawings wherein.

DETAILED DESCRIPTION OF WORKING EMBODIMENTS

Figure 1:
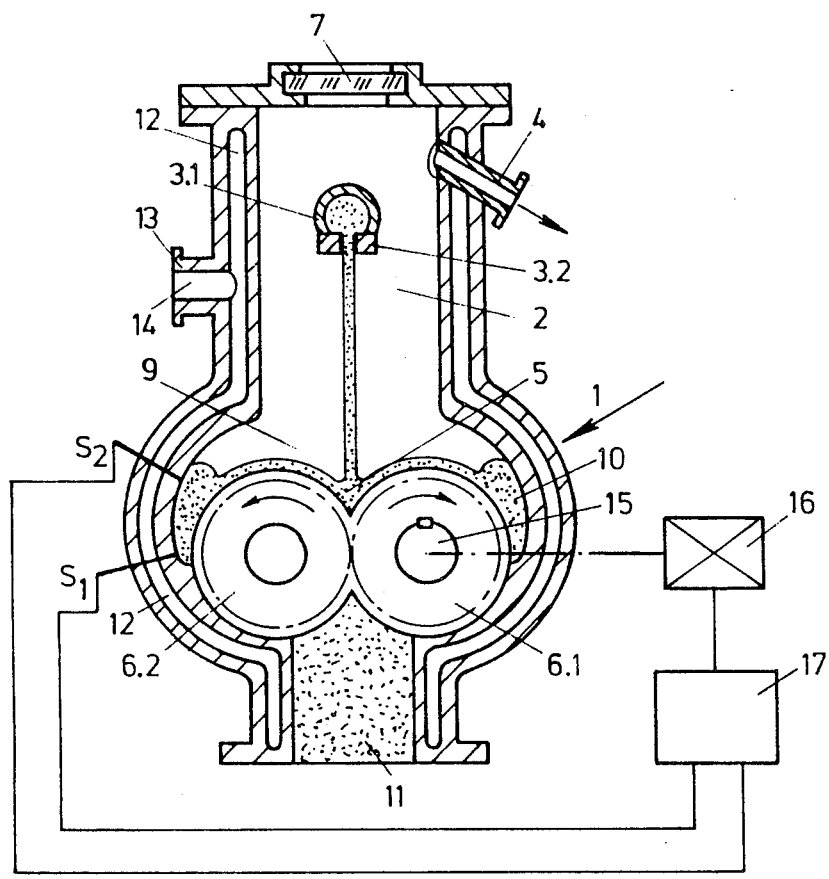
FIG. 1 is a partly schematic illustration of one embodiment according to the invention.

In FIG. 1, there is shown a schematic cross-section perpendicular to the axis of the gear wheel pump 1 used for degassing the polymer melt 8. Shaft 15 is driven by the schematically illustrated motor 16. The gear wheel 6.1 is tightly fastened to the shaft 15 for rotation therewith. Gear wheel 6.2 is seated freely turnable and is driven by gear wheel 6.1. The direction of rotation is indicated by the arrows on the gear wheels.

In the pump feed chamber 2 enclosed by the housing of the feed pump, a melt supply tube 3.1 is led, e.g. from a screw extruder. This supply tube exhibits on its underneath side a narrow slot in the form of a discharge nozzle 3.2 which lies vertically above the opening nip 5 of the paired gear wheels 6 and which extends essentially over the width (axial length) of the gear wheels 6. The polymer melt 8 flows with a throttle effect through the nozzle 3.2 into the feed chamber 2 of the gear wheel pump 1, such that the resulting melt spray is spread out into a melt curtain. By means of a pressure release line 4 above the nozzle 3, a reduced pressure (below 1 bar) is produced in the feed chamber 2. The supply nozzle 3 is installed at a spaced interval above the melt surface.

Sensors S1 and S2 monitor the liquid level of the melt. The output signals of these sensors are delivered to a regulating unit 17 which operates the variable speed motor 16. Through this regulating means, the speed of the gear wheel pump is so controlled that a constant shallow filling level of the melt in the gear wheel pump 1 is guaranteed.

By means of a viewing glass 7, the filling point or liquid level can be secondarily controlled by optical means. The filling zone 9 is widened in the circumferential direction of the gear wheels 6 by the entry pockets 10. The base segments of these pockets 10 are extended essentially radially just slightly below the common plane of the gear wheel axes of rotation. Each pocket is then rounded upwardly in an arc gradually becoming more distant from the associated gear wheel to create a wedge shaped catchment area or retention zone. A rotational or circular melt kneading is thus achieved in the entry pockets, whereby new surfaces are constantly created for the degassing of the melt 8.

The sensors S1 and S2 are located in all cases below the nozzle 3.2, but preferably in the region directly adjacent one or both entry pockets 10. In this manner, only a thin melt film forms on the upper circumference of the gear wheels 6, preferably just thick enough to fill up the gear teeth gaps or spaces.

The gear wheel pump 1 essentially acts to transport the degassed melt from its region of lower pressure in the feed pump chamber to a region of higher pressure through the exit connections or stubs 11, e.g. to a spinning or filament extruding nozzle for manufacture of a finished product. The pump housing is constructed with double walls and is enclosed by a hollow space 12. The hollow space 12 can be provided with connecting nipples 14 which end in a flange 13, over which the system can be conventionally placed in fluid connection with a source of a heating agent, for example using a diphenyl heat exchange system. To be sure, other heating means are also feasible, for example with the help of electrical resistance heating elements.

Figure 2:
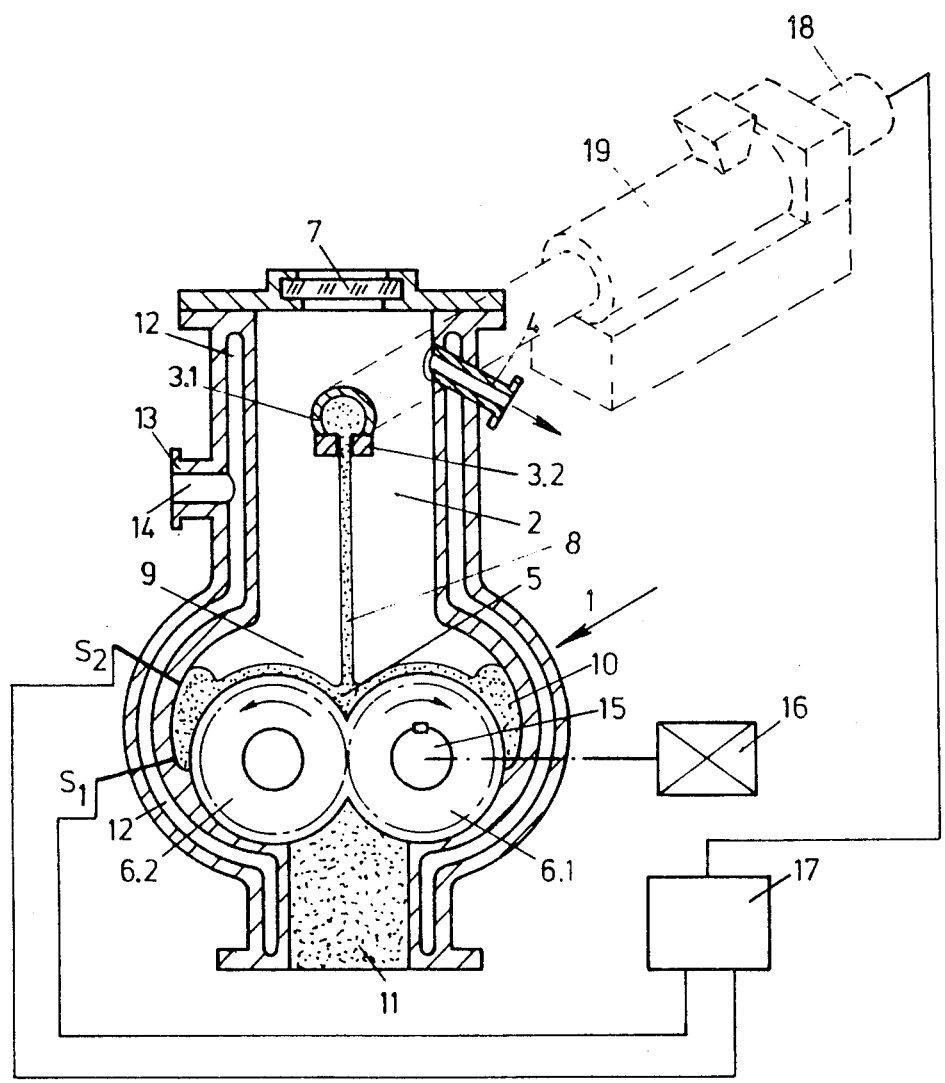
FIG. 2 illustrates an alternative embodiment with a speed regulation of the feed device in dependence upon the filling level in the feed chamber of the gear wheel pump.

FIG. 2 shows an alternative embodiment of the regulating means to control the filling level of the polymer melt being degassed. In this embodiment, the sensors S1 and S2 deliver measured values to the regulating unit 17 for the desired filling position of the polymer melt 8. The regulator 17 for its part controls the drive motor 18 and the rotational speed of a screw extruder 19 connected to the entry side of the gear wheel pump 1, and thus controls the rate of extrusion of polymer melt 8 through the feed nozzle 3.2, while the gear wheel pump 1 is driven at a constant speed.

It should be noted that the term "pressure-independent stream" is employed here to define a stream of liquid, the velocity and output volume (volume/time unit) is independent of the pressure applied to said liquid, as for example the output volume of an extruder extruding a polymer melt.

Other similar and equivalent embodiments of the invention can be easily adopted without departing from the spirit or scope of the invention as set forth by the claims below.

The invention is hereby claimed as follows:

1. In a process for the degassing of liquids, including polymer melts and solutions, to be processed or manufactured into finished products, the improvements which comprises:

conveying the liquid as a pressure-independent stream, which contains pressure-releasable impurities of substantially lower boiling point, under expansion of pressure for introduction into the feed chamber of a gear wheel pump having paired gear wheels oppositely rotating with an upwardly opening nip which transports said liquid outwardly and then downwardly into an entry zone formed between an outer circumferential part of each gear wheel and the adjacent peripheral wall of the pump, said liquid being introduced at a pint located directly above said opening nip in said feed chamber;

withdrawing from the feed chamber the impurities which are released as a gas by said expansion;

allowing the liquid to flow under the influence of gravity to form a pool on the gear wheels of the pump as the liquid is transported outwardlly by said gear wheels into said entry zone and then downwardly to an exit zone of higher pressure; and controlling the filling position of the liquid pool in the feed chamber to a partial filling such that only a thin melt film forms on the upper circumference of the gear wheels.

2. A process according to claim 1, wherein the pressure in said feed chamber is maintained below 1 bar.

3. A process according to claim 2, wherein the feed chamber is evacuuated at a point above that at which the liquid is introduced.

4. A process according to claim 1, wherein the liquid is throttled directly into the feed chamber.

5. A process according to claim 1, wherein the liquid is introduced into said feed chamber as a thin liquid film or as a plurality of partial streams.

6. A process according to claim 5, wherein the partial filling position of the liquid in the feed chamber is controlled by adjusting the rate at which the liquid is introduced into the feed chamber and/or the rate at which the liquid is pumped out of said feed chamber.

7. A process according to claim 1, wherein the polymer melt is injected through a nozzle as a jet with widely distributed surfaces to flow into the opening nip of the paired gear wheels of the pump and to the paired gear wheels in the form of a film.

8. A process according to claim 1, wherein the point of introduction of the liquid into the feed chamber lies above the paired gear wheels at a spaced interval in relation to the liquid level maintained at a partial filling.

9. A process according to claim 1, wherein sensors are used to detect the highest and lowest points of the liquid level in the feed chamber, said sensors energizing a regulating device which in turn so controls the speed of rotation of the paired gear wheels and/or the rate of liquid introduction into the feed chamber that the partial liquid filling is maintained at a predetermined level.

10. A process according to claim 1, wherein the liquid level is maintatined at about or below the tangential plane common to the crown line of the paired gear wheels, and the liquid flows from said crown line into a catchment zone defined between each of said gear wheels and the surrounding walls of the feed chamber such that the liquid is recirculated in this catchment zone to constantly produce new exposed liquid surfaces.

11. Apparatus for the degassing of high-boiling liquids, including polymer melts and solutions, to remove substantially lower boiling liquids and gases as impurities therefrom, which apparatus comprises:

a gear wheel pump having a housing with liquid inlet and liquid outlet lines connected thereto, said housing enclosing paired gear wheels disposed betweeen the inlet and outlet lines, said gear wheels being engaged for opposite rotation with an upwardly opening nip facing a feed chamber arranged above said gear wheels on the inlet side of the housing, and each of said gear wheels forming a liquid entry pocket between an outer circumferential part of the wheel and the adjacent peripheral wall of said feed chamber;

nozzle means to introduce liquid under release of pressure into said feed chamber at a point which lies above the upwardly opening nip of the paired gear wheels, allowing the liquid to flow downwardly under the influence of gravity onto said gear wheels;

means to oppositely rotate said gear wheels upwardly and outwardly from the opening nip to transport liquid outwardly and the downwardly into said entry pocket while passing the liquid from said inlet side under increasing pressure to said outlet line;

regulating means to control the relative rate of introduction of the liquid with reference to its rate of transport by the gear wheels such that the liquid level in the feed chamber is maintained at a preset level only partially filling said feed chamber; and a pressure relief connection on said feed chamber at a position upstream from the preset liquid level and far enough away from the liquid inlet for removal of the impurities in gas form without removing any significant portion of the liquid.

12. Apparatus as claimed in claim 11, wherein said nozzle means is an extrusion die having one or more openings for introduction of the liquid as a broad thin band or as multiple filamentary strands to maximize the exposed surface area of the liquid.

13. Apparatus as claimed in claim 11, wherein said regulation means include sensors projecting into said housing adjacent the paired gear wheels at positions corresponding to the highest and lowest preset liquid levels.

14. Apparatus as claimed in claim 13, wherein the sensors are temperature or pressure sensors.

15. Apparatus as claimed in in claim 11, wherein the housing contains wedge-shaped entry pockets along the outermost periphery of the paired gear wheels to induce a circulatory mixing and exposure of new liquid surfaces alongside each gear wheel, the pocket in each case narrowing in the direction of gear wheel rotation so that a portion of the liquid in each pocket is forced upwardly toward a preset liquid level.

* * * * *

UNITED STATES PATENT AND TRADEMARK OFFICE
CERTIFICATE OF CORRECTION

PATENT NO. : 4,711,647

DATED : December 8, 1987

INVENTOR(S) : Egon Gathmann

It is certified that error appears in the above-identified patent and that said Letters Patent is hereby corrected as shown below:

Claim 1, line 15:   change "pint" to --point--.

Claim 11, line 24:  change "the" to --then--.

Signed and Sealed this

Nineteenth Day of April, 1988

Attest:

DONALD J. QUIGG

*Attesting Officer*        *Commissioner of Patents and Trademarks*